(12) United States Patent
Wang

(10) Patent No.: US 12,307,237 B2
(45) Date of Patent: *May 20, 2025

(54) FIRMWARE UPDATING METHOD AND DATA STORAGE DEVICE UTILIZING THE SAME

(71) Applicant: Silicon Motion, Inc., Hsinchu County (TW)

(72) Inventor: Te-Kai Wang, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 202 days.

This patent is subject to a terminal disclaimer.

(21) Appl. No.: 18/219,114

(22) Filed: Jul. 7, 2023

(65) Prior Publication Data

US 2024/0152348 A1    May 9, 2024

(30) Foreign Application Priority Data

Nov. 4, 2022    (TW) ................... 111142220

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,743,284 B1* | 6/2010 | Taylor | G11B 27/36 714/45 |
| 8,560,823 B1* | 10/2013 | Aytek | G06F 8/654 713/2 |
| 9,830,099 B1* | 11/2017 | Johansson | G06F 3/0623 |

(Continued)

FOREIGN PATENT DOCUMENTS

| | | |
|---|---|---|
| CN | 105357572 A | 2/2016 |
| CN | 113821238 A | 12/2021 |

(Continued)

OTHER PUBLICATIONS

Wang, the specification, including the claims, and drawings in the U.S. Appl. No. 18/218,600, filed Jul. 6, 2023.

*Primary Examiner* — Philip Wang
(74) *Attorney, Agent, or Firm* — Winston Hsu

(57) ABSTRACT

A data storage device includes a memory device and a memory controller. The memory controller executes a first firmware, sets a value of a lock indicator to a first value and receives a first firmware update command in the first firmware. In response to the first firmware update command, the memory controller receives a file of a second firmware. When a version number of the second firmware is a specific version number, the memory controller sets the value of the lock indicator to a second value. When the version number of the second firmware is not a specific version number, the memory controller performs an unlocked firmware update procedure when the value of the lock indicator is set to the second value, and performs a locked firmware update procedure when the value of the lock indicator is not set to the second value.

14 Claims, 6 Drawing Sheets

(56) References Cited

U.S. PATENT DOCUMENTS

| | | | | |
|---|---|---|---|---|
| 2005/0060124 A1* | 3/2005 | Chen | ............... | G06F 11/3636 |
| | | | | 702/185 |
| 2009/0150878 A1* | 6/2009 | Pathak | ............... | G06F 8/65 |
| | | | | 717/172 |
| 2011/0208975 A1* | 8/2011 | Sibert | ............... | G06F 21/572 |
| | | | | 713/189 |
| 2015/0324301 A1* | 11/2015 | Iizuka | ............... | G06F 21/00 |
| | | | | 713/193 |
| 2017/0131997 A1* | 5/2017 | Wang | ............... | G06F 8/654 |
| 2019/0042230 A1* | 2/2019 | Dewan | ............... | G06F 21/57 |
| 2020/0019397 A1* | 1/2020 | Duran | ............... | H04L 41/082 |
| 2022/0398091 A1* | 12/2022 | Mugunda | ............... | G06F 8/654 |

FOREIGN PATENT DOCUMENTS

| | | | | |
|---|---|---|---|---|
| JP | 2023088703 A | * | 6/2023 | ......... G06F 11/1417 |
| TW | 200414045 | | 8/2004 | |
| TW | 200502760 | | 1/2005 | |
| TW | 200643796 | | 12/2006 | |
| TW | 201207731 A1 | | 2/2012 | |
| WO | WO-2022172355 A1 | * | 8/2022 | |

\* cited by examiner

FIRMWARE UPDATING METHOD AND DATA STORAGE DEVICE UTILIZING THE SAME

BACKGROUND OF THE INVENTION

1. Field of the Invention

The invention relates to a firmware updating method, more particularly to a firmware updating method for protectively updating firmware of a data storage device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes.

Generally, firmware for different purposes may be developed for the same data storage device based in different need. For example, there may be the firmware for debugging purpose, the firmware for verification purpose, and the final firmware required for the mass production of data storage device. Firmware for different purposes is usually given a different tag as a distinction, which also means that the firmware has a different attribute.

To prevent users from improperly updating the firmware of the data storage device, the data storage device usually has a protection mechanism to prohibit the currently operating firmware from being updated to a firmware with different attributes or an older version. However, in practical applications, there is still a need to replace the currently operating firmware with the firmware having a different property. For example, in the development stage of data storage devices, if an error occurs, there may be a need to update the currently operating firmware, which may be firmware designed for the mass production of the data storage device product, to the firmware developed for debugging, to facilitate the debugging operations. However, under the aforementioned protection mechanism, if the firmware for replacement has a different attribute, the currently operating firmware can only be replaced through a complicated method. For example, in the way of burning the firmware with a different attribute into the data storage device, so that the firmware with a different attribute can overwrite the original firmware.

To make the firmware update of the data storage device more flexible and meanwhile not abandoning the necessity of the protection mechanism, a novel firmware updating method is required.

SUMMARY OF THE INVENTION

It is an objective of the invention to provide a firmware updating method for protectively updating firmware of a data storage device for the firmware update of the data storage device to be more flexible and meanwhile the necessity of the protection mechanism also being considered.

According to an embodiment of the invention, a data storage device comprises a memory device and a memory controller coupled to the memory device and configured to access the memory device. The memory controller is configured to execute a first firmware for the first firmware to be a currently operating firmware, maintain a lock indicator and set a value of the lock indicator to a first value when operating in the first firmware and receive a first firmware update command. In response to the first firmware update command, the memory controller is configured to receive a file of a second firmware and determine whether a version number of the second firmware is set to a specific version number. When the version number of the second firmware is set to the specific version number, the memory controller sets the value of the lock indicator to a second value. When the version number of the second firmware is not set to the specific version number, the memory controller further determines whether the value of the lock indicator is set to the second value. When the value of the lock indicator is set to the second value, the memory controller performs an unlocked firmware update procedure, and when the value of the lock indicator is not set to the second value, the memory controller performs a locked firmware update procedure.

According to an embodiment of the invention, a firmware updating method for protectively updating a firmware of a data storage device comprises: executing a first firmware after the data storage device powers up; and receiving a first firmware update command. Step of executing the first firmware after the data storage device powers up further comprises: maintaining a lock indicator and setting a value of the lock indicator to a first value. In response to reception of the first firmware update command, the firmware updating method further comprises: receiving a file of a second firmware and determining whether a version number of the second firmware is set to a specific version number; setting the value of the lock indicator to a second value when the version number of the second firmware is set to the specific version number; determine whether the value of the lock indicator is set to the second value when the version number of the second firmware is not set to the specific version number; performing an unlocked firmware update procedure when the value of the lock indicator is set to the second value; and performing a locked firmware update procedure when the value of the lock indicator is not set to the second value.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
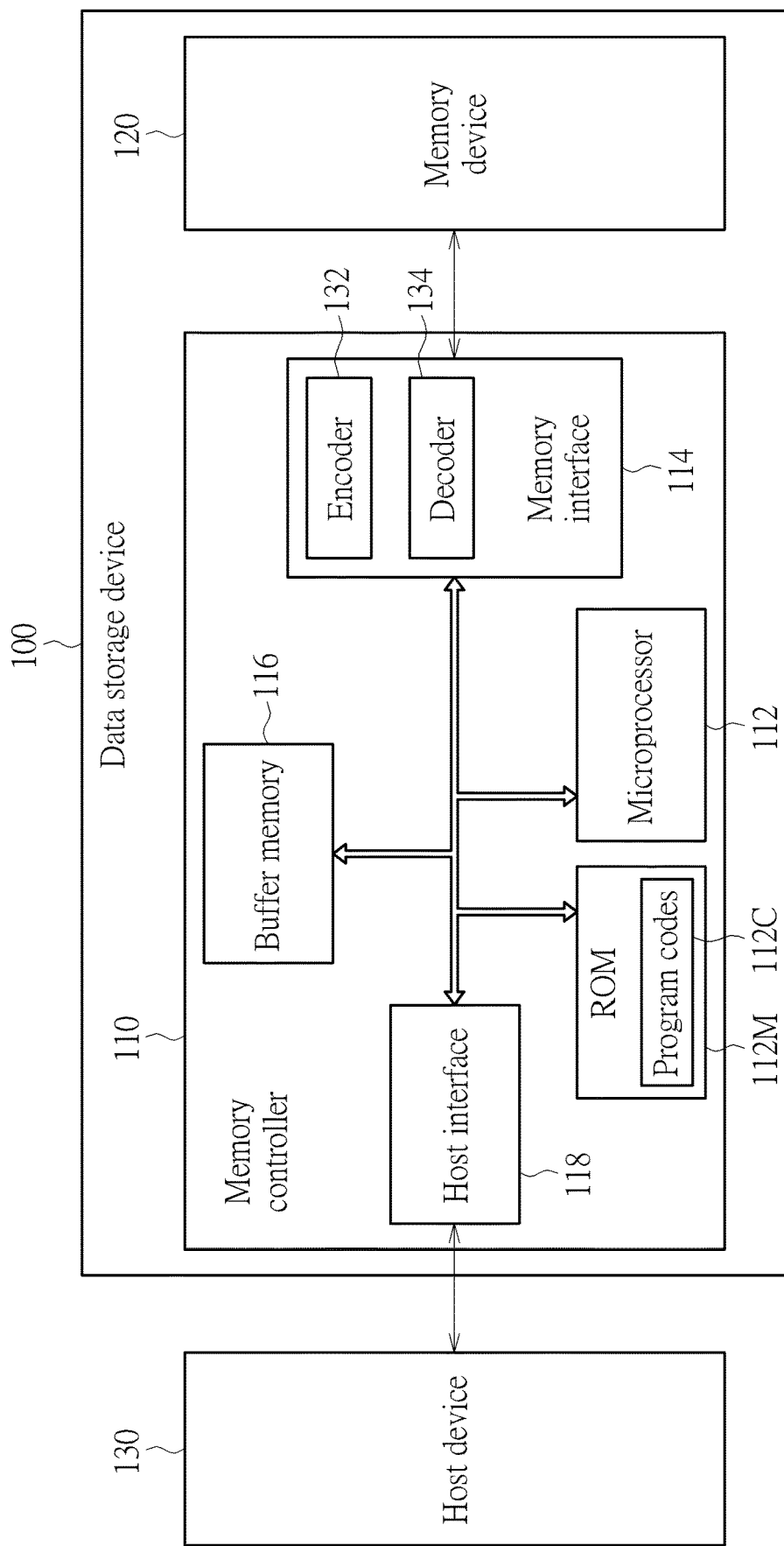
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

As described above, the data storage device 100 usually has a protection mechanism to prohibit the currently operating firmware from being updated to a firmware with different attributes or an older version. However, the protection mechanism also limits the flexibility of updating the firmware. To make the firmware update of the data storage device more flexible and meanwhile considering the necessity of the protection mechanism, a novel firmware updating method is required to protectively update the firmware of the data storage device 100.

Figure 2:
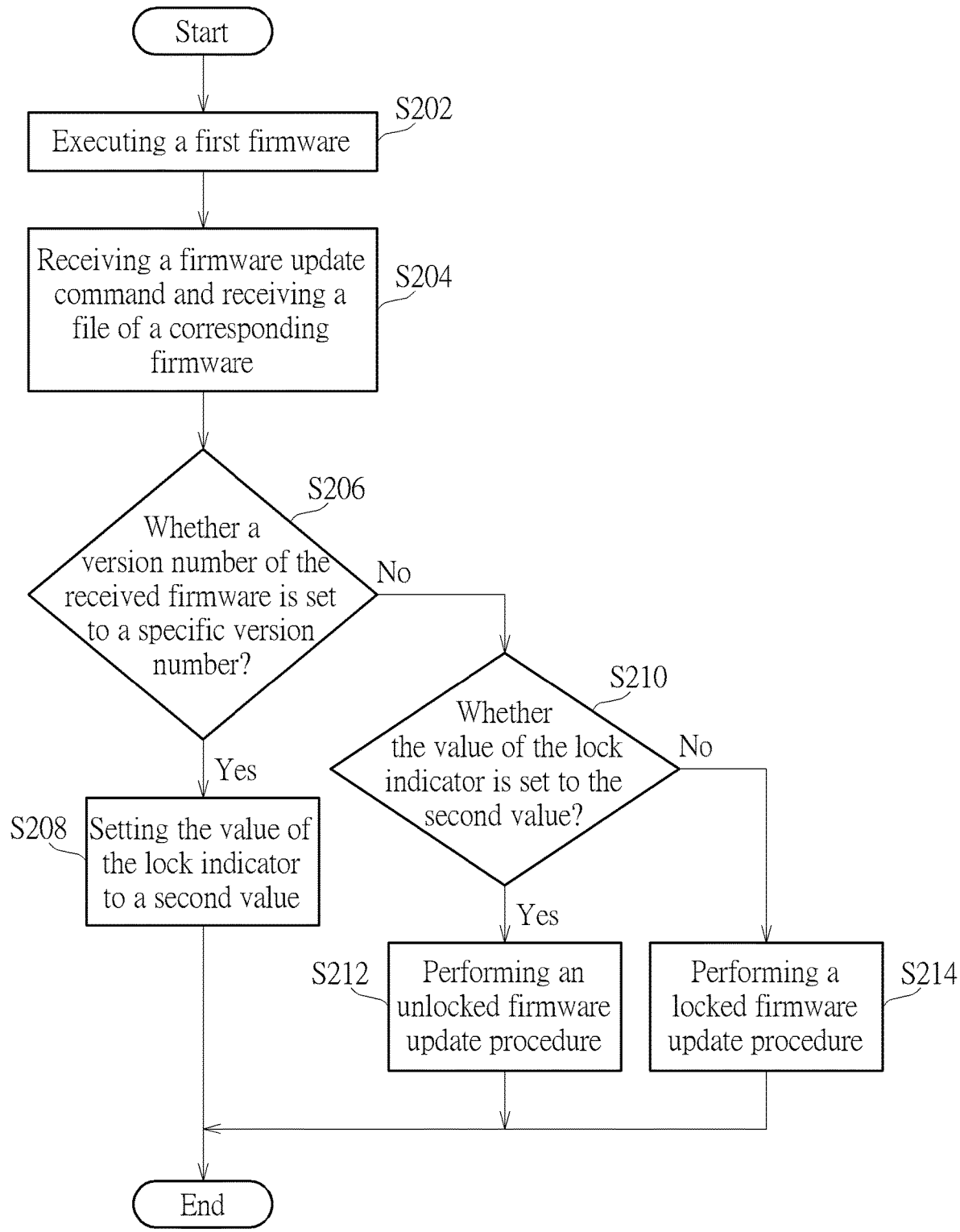
FIG. 2 shows a schematic flow chart of the firmware updating method to protectively update the firmware of the data storage device according to an embodiment of the invention.

FIG. 2 shows a schematic flow chart of the firmware updating method to protectively update the firmware of the data storage device according to an embodiment of the invention. The proposed firmware updating method may be performed by the memory controller 110 (e.g., the microprocessor 112 in the memory controller 110) and may comprise the following steps:

Step S202: executing a first firmware after the data storage device powers up, for the first firmware to be a currently operating firmware. According to an embodiment of the invention, the memory controller may maintain a lock indicator when operating in the first firmware and set a value of the lock indicator to a first value, to represent that a firmware update status of the data storage device 100 is set to a locked status. Generally, the locked status is a default status. The value of the lock indicator may be stored in the memory device 120, so that the value set before the data storage device is reset can be preserved.

Step S204: receiving a firmware update command and receiving a file of a second firmware in response to reception of the firmware update command.

Step S206: determining whether a version number of the second firmware is set to a specific version number. If the determination result shows yes, step S208 is performed. If the determination result shows no, step S210 is performed.

Step S208: setting (or, changing) the value of the lock indicator to a second value different from the first value, to represent that the firmware update status of the data storage device 100 is set to an unlocked status.

Step S210: determining whether the value of the lock indicator is set to the second value. If the determination result shows yes, step S212 is performed. If the determination result shows no, step S214 is performed.

Step S212: performing an unlocked firmware update procedure.

Step S214: performing a locked firmware update procedure.

According to an embodiment of the invention, when the version number of the second firmware is set to the specific version number, the second firmware is a bridge firmware, and in an embodiment of the invention, the file of the bridge firmware may comprise only information regarding the specific version number and dummy data. In other words, in an embodiment of the invention, the bridge firmware may be a fake or dummy firmware which comprises no real firmware codes, and the useful data carried by the bridge firmware may only comprise information regarding the specific version number. According to an embodiment of the invention, the specific version number may be a predetermined string or may be binary data with a predetermined pattern.

In addition, according to an embodiment of the invention, in response to the determination of that the version number of the second firmware being set to the specific version number, the memory controller may change a status of the first firmware from a normal status to a bridge status, wherein the normal status corresponds to the aforementioned locked status, representing that the firmware update status of the data storage device is set to the locked status, while the bridge status corresponds to the aforementioned unlocked status, representing that the firmware update status of the data storage device is set to the unlocked status.

FIG. 2 shows the conceptual flow of using the bridge firmware to switch the firmware update status of the data storage device in the proposed firmware updating method, so as to differentiate the locked firmware update procedure and the unlocked firmware update procedure (which will be described in more detail in the following paragraphs). In the embodiments of the invention, the data storage device 100 may sequentially receive at least two firmware update commands when operating in the first firmware, wherein the first firmware update command is issued for changing the firmware update status of the data storage device by using the bridge firmware and the second firmware update command is issued for implementing the firmware update operation in practice (e.g., the firmware update will actually be performed in response to the second firmware update command).

Figure 3:
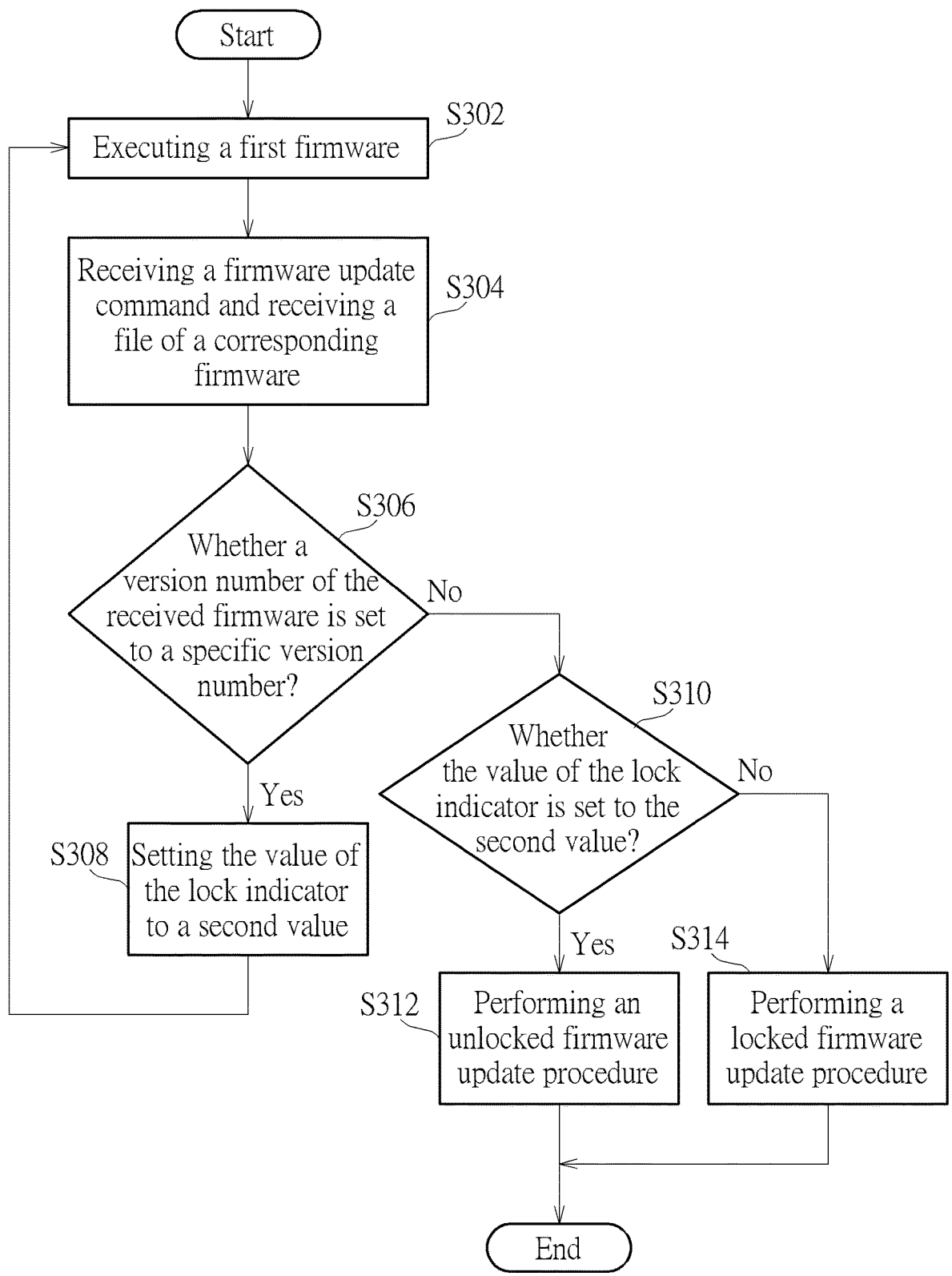
FIG. 3 shows an exemplary flow chart of a firmware updating method to protectively update the firmware of the data storage device according to an embodiment of the invention.

FIG. 3 shows an exemplary flow chart of a firmware updating method to protectively update the firmware of the data storage device according to an embodiment of the invention. The proposed firmware updating method may be performed by the memory controller 110 (e.g., the microprocessor 112 in the memory controller 110) and may comprise the following steps:

Step S302: executing a first firmware after the data storage device powers up, for the first firmware to be a currently operating firmware. Similarly, the memory controller may maintain a lock indicator when operating in the first firmware and set a value of the lock indicator to a first value, to represent that a firmware update status of the data storage device 100 is set to a locked status, where the locked status is a default status and the value of the lock indicator may be stored in the memory device 120.

Step S304: receiving a firmware update command and receiving a file of a firmware in response to reception of the firmware update command. At this time, the firmware update command is the first firmware update command and the received firmware file is the file of the second firmware.

Step S306: determining whether a version number of the received firmware is set to a specific version number. If the determination result shows yes, step S308 is performed. If the determination result shows no, step S310 is performed.

Step S308: setting (or, changing) the value of the lock indicator to a second value different from the first value, to represent that the firmware update status of the data storage device 100 is set to an unlocked status. After changing the value of the lock indicator, the operations corresponding to the first firmware update command are completed and step S302 is returned for the processor 112 to keep executing the first firmware.

When operating in the first firmware, the memory controller 110 may again receive a firmware update command, that is, performing step S304 again to receive a firmware update command and receive the file of a corresponding firmware in response to reception of the firmware update command. At this time, the firmware update command is the second firmware update command and the received firmware file is the file of the third firmware, and the third firmware is different from the second firmware.

In a correct firmware update operation, the third firmware is the one the host device 130 wants to update to the data storage device 100. Therefore, the version number of the third firmware will not be set to the aforementioned specific version number, but a normal version number. Under this condition, the determination result in step S306 with respect to the third firmware is no, and step S310 is performed.

Step S310: determining whether the value of the lock indicator is set to the second value. If the determination result shows yes, step S312 is performed. If the determination result shows no, step S314 is performed.

Step S312: performing an unlocked firmware update procedure and directly replace the first firmware with the third firmware in the unlocked firmware update procedure.

Step S314: performing a locked firmware update procedure. In the locked firmware update procedure, the memory controller 110 may further check whether the third firmware complies with a predetermined rule. When the third firmware complies with the predetermined rule, the memory controller replaces the first firmware with the third firmware in the locked firmware update procedure, and when the third firmware does not comply with the predetermined rule, the memory controller does not replace the first firmware with the third firmware. That is, when determining that the third firmware does not comply with the predetermined rule, the firmware of the data storage device 100 is not updated.

According to an embodiment of the invention, the firmware update command may be the field firmware update (FFU) defined by the UFS, and may be implemented by the write buffer command. For example, in an embodiment of the invention, the value of a Mode field of the write buffer command may be set to a specific value, as an example, 0xE, to represent that this write buffer command is utilized for field firmware update.

In addition, according to an embodiment of the invention, the host device 130 may transmit the write buffer command (i.e., the aforementioned firmware update command) and the corresponding firmware file through the host interface 118 to the memory controller 110.

Figure 4:
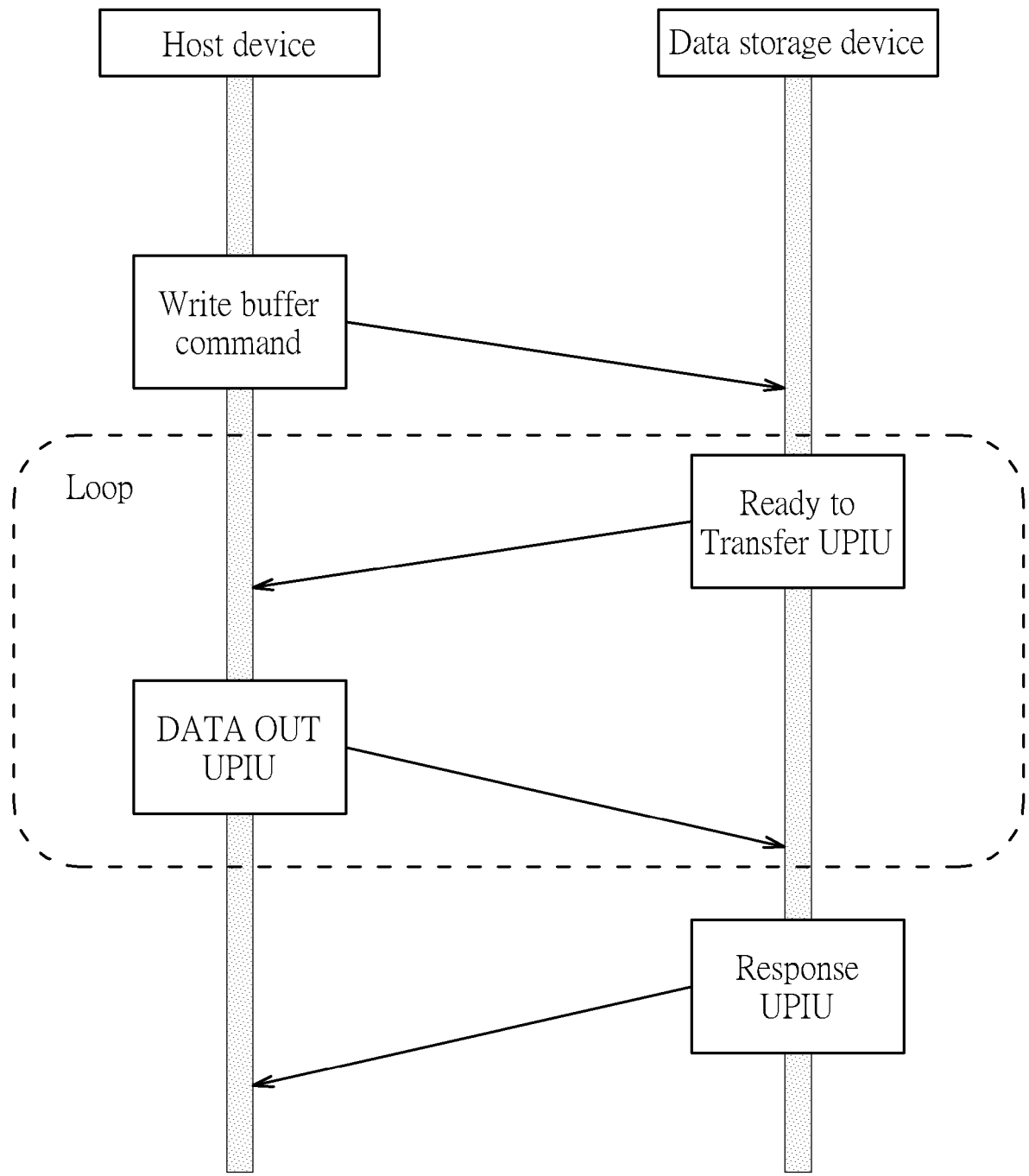
FIG. 4 shows an exemplary message flow for transmitting the firmware update command and corresponding firmware file between the host device and the data storage device through the host interface according to an embodiment of the invention.

FIG. 4 shows an exemplary message flow for transmitting the firmware update command and corresponding firmware file between the host device 130 and the data storage device 100 through the host interface 118 according to an embodiment of the invention. The host device 130 transmits a write buffer command to the data storage device 100 through the host device 118, where the value of the Mode field of the write buffer command may be set to a specific value (e.g., 0xE) as described above, to represent that this write buffer command is utilized for FFU. In response to reception of the write buffer command for FFU, the data storage device 100 may reply a Ready to Transfer UFS Protocol Information Unit (UPIU) to the host device 130. Then the host device 130 may transmit the DATA OUT UPIU to the data storage device 100, so as to provide the firmware file for firmware updating to the data storage device. It is noted that if the firmware file cannot be fully transmitted to the data storage device by using only one UPIU, the data storage device 100 may reply the Ready to Transfer UPIU again after successfully receiving the DATA OUT UPIU. Therefore, the messages of Ready to Transfer UPIU and DATA OUT UPIU may actually be transmitted for several times, and the loop drawn by dotted line in FIG. 4 is an illustration of repeatedly message transmission. After the data storage device 100 has received the last portion of the firmware, a Response UPIU is transmitted to the host device 130.

According to an embodiment of the invention, the predetermined rule utilized in the aforementioned locked firmware update procedure is that the replacement firmware (i.e., the new firmware, which is the firmware for replacement) and the firmware to be replaced (i.e., the operating or running firmware) must be the firmware having the same tag (i.e., the same attribute). According to another embodiment of the invention, the predetermined rule utilized in the aforementioned locked firmware update procedure is that the replacement firmware (i.e., the new firmware) and the firmware to be replaced (i.e., the operating or running firmware) must be the firmware having the same tag and a version of the new firmware must be later (for example, having a version number with a higher value) than a version of the operating firmware.

On the other hand, according to an embodiment of the invention, in the aforementioned unlocked firmware update procedure, there is no need to consider the aforementioned predetermined rule when updating the firmware. Therefore, the replacement firmware (i.e., the new firmware) and the firmware to be replaced (i.e., the operating or running firmware) may be the firmware having different tags (i.e., different attributes) or the firmware having the same tag (i.e., the same attribute). In addition, it is not necessary for the version of the new firmware to be later than the version of the operating firmware (for example, the version of these two firmware may be the same or different, and when the version of these two firmware are different, the version the version of the new firmware may be earlier or later than the version of the operating firmware).

Figure 5:
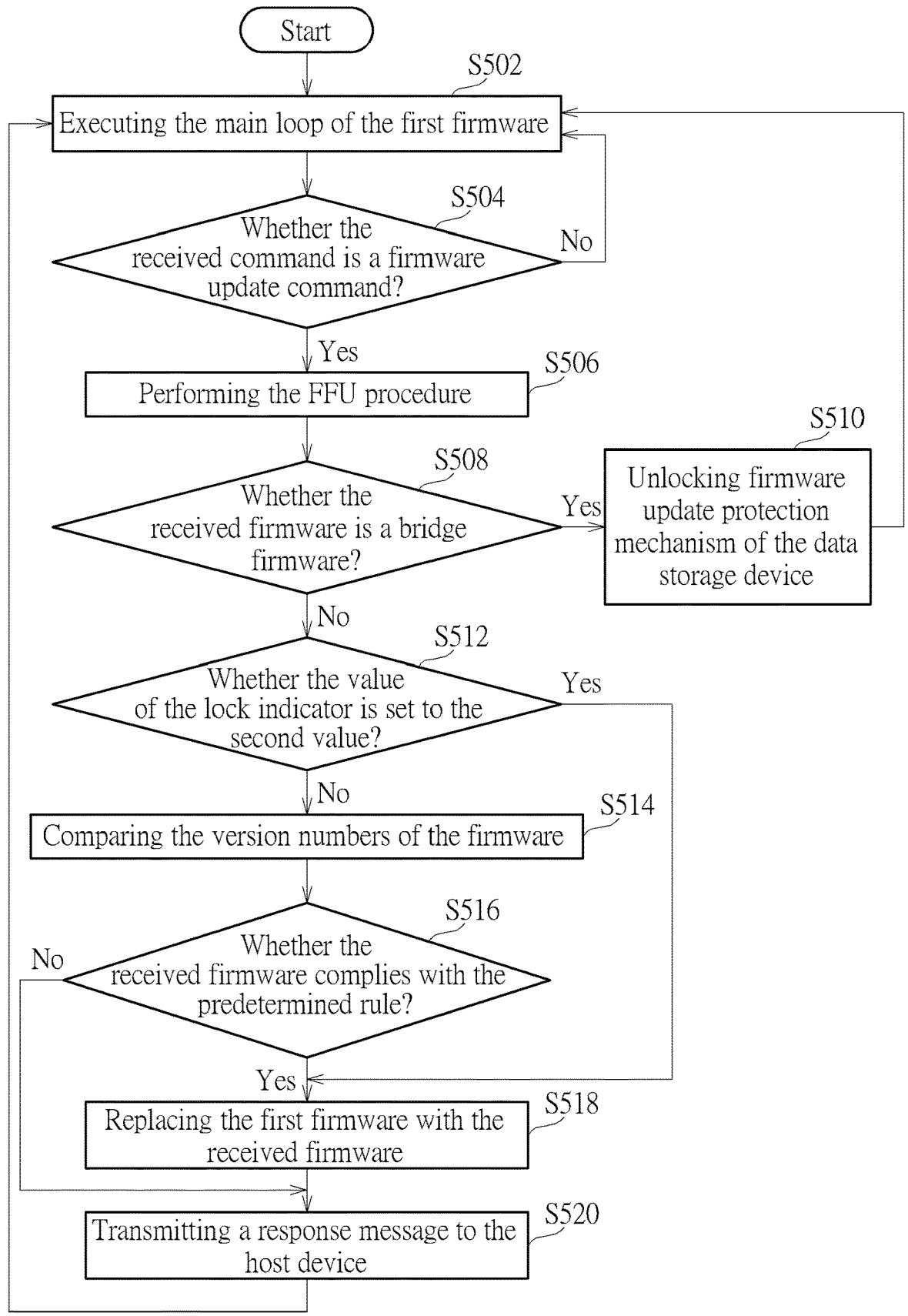
FIG. 5 is an exemplary flow chart showing a detailed flow of a firmware updating method according to an embodiment of the invention.

FIG. 5 is an exemplary flow chart showing a detailed flow of a firmware updating method according to an embodiment of the invention. The proposed firmware updating method may be performed by the memory controller 110 (e.g., the microprocessor 112 in the memory controller 110) and may comprise the following steps:

Step S502: executing a first firmware after the data storage device powers up. Similarly, the memory controller may maintain a lock indicator when operating in the first firmware and the value of the lock indicator may be set to a first value by default, to represent that a firmware update status of the data storage device 100 is set to a locked status. The execution of step S502 represents that the microprocessor 112 is currently operating in the main loop of the first firmware. When the microprocessor 112 receives any command, the microprocessor 112 may jump out of the main loop to perform the corresponding operation.

Step S504: determining whether a received command is a firmware update command. When it is determined that the command received by the microprocessor 112 is a firmware update command, step S506 is entered to perform the corresponding operation. When it is determined that the command received by the microprocessor 112 is not a firmware update command, step S502 may be returned to keep operating in the main loop of the first firmware.

Step S506: performing the field firmware update (FFU) procedure and receiving the corresponding firmware file in response to the reception of the firmware update command.

Step S508: determining whether a version number of the received firmware is set to a specific version number, thereby determining whether the received firmware is a bridge firmware. When the version number of the received firmware is set to the specific version number, step S510 is performed. When the version number of the received firmware is not set to the specific version number, step S512 is performed.

Step S510: setting (or, changing) the value of the lock indicator to a second value different from the first value, to represent that the firmware update status of the data storage device 100 is set to an unlocked status. That is, the protection mechanism for the firmware update is now unlocked. After changing the value of the lock indicator, the operations corresponding to this firmware update command are completed and step S502 may be returned for the microprocessor 112 to operate in the main loop of the first firmware and wait for a next firmware update command.

Step S512: determining whether the value of the lock indicator is set to the second value. If the determination result shows yes, it means that the protection mechanism on the data storage device for the firmware update is unlocked and step S518 is performed for the microprocessor 112 to perform the unlocked firmware update procedure. If the determination result shows no, it means that the protection mechanism on the data storage device for the firmware update is still working and step S514 is performed for the microprocessor 112 to perform the locked firmware update procedure. For the case when the FFU procedure corresponding to the bridge firmware is ended and step S502 is returned, and when the microprocessor 112 receives the next firmware update command for actually performing the firmware update operation, the determination result in step S508 would be no and thus step S512 is entered.

Step S514: comparing the version number of the received firmware with the version number of the first firmware to facilitate the determination of whether the received firmware complies with the aforementioned predetermined rule in step S516.

Step S516: determining whether the received firmware complies with the predetermined rule. If the determination result shows yes, which means that the microprocessor 112 may replace the currently operating first firmware with the received firmware and step S518 is performed. If the determination result shows no, which means that the microprocessor 112 is not allowed to replace the currently operating first firmware with the received firmware and step S520 is performed.

Step S518: replacing the first firmware with the received firmware. Besides writing the received firmware codes into the data storage device 100, the operation of updating the firmware may also comprise setting the corresponding parameters so that the microprocessor 112 executes the new firmware codes after the data storage device powers up again.

Step S520: transmitting a response message to the host device. When determining that the received firmware does not comply with the predetermined rule, the microprocessor 112 is not allowed to replace the currently operating first firmware with the received firmware. Therefore, the microprocessor 112 may transmit a update failure response message to the host device to notify the host device of the result of firmware update failure. On the other hand, when step S520 is entered after the firmware update in step S518 is completed, the microprocessor 112 may transmit a update successful response message to the host device to notify the host device of the result of firmware update successful.

In an embodiment of the invention, to prevent the data storage device 100 from being unable to receive the next firmware update command which actually used for firmware update after the FFU procedure corresponding to the bridge firmware ends, the memory controller 110 may further record a reset count of the data storage device 100 and determine whether a value of the reset count is greater than a threshold every time when the data storage device 100 powers up. When the current value of the reset count is greater than the threshold, the memory controller 110 may revert the firmware update status of the data storage device to the default locked status by setting the status of the first firmware to the normal status and setting the value of the lock indicator to the first value.

Figure 6:
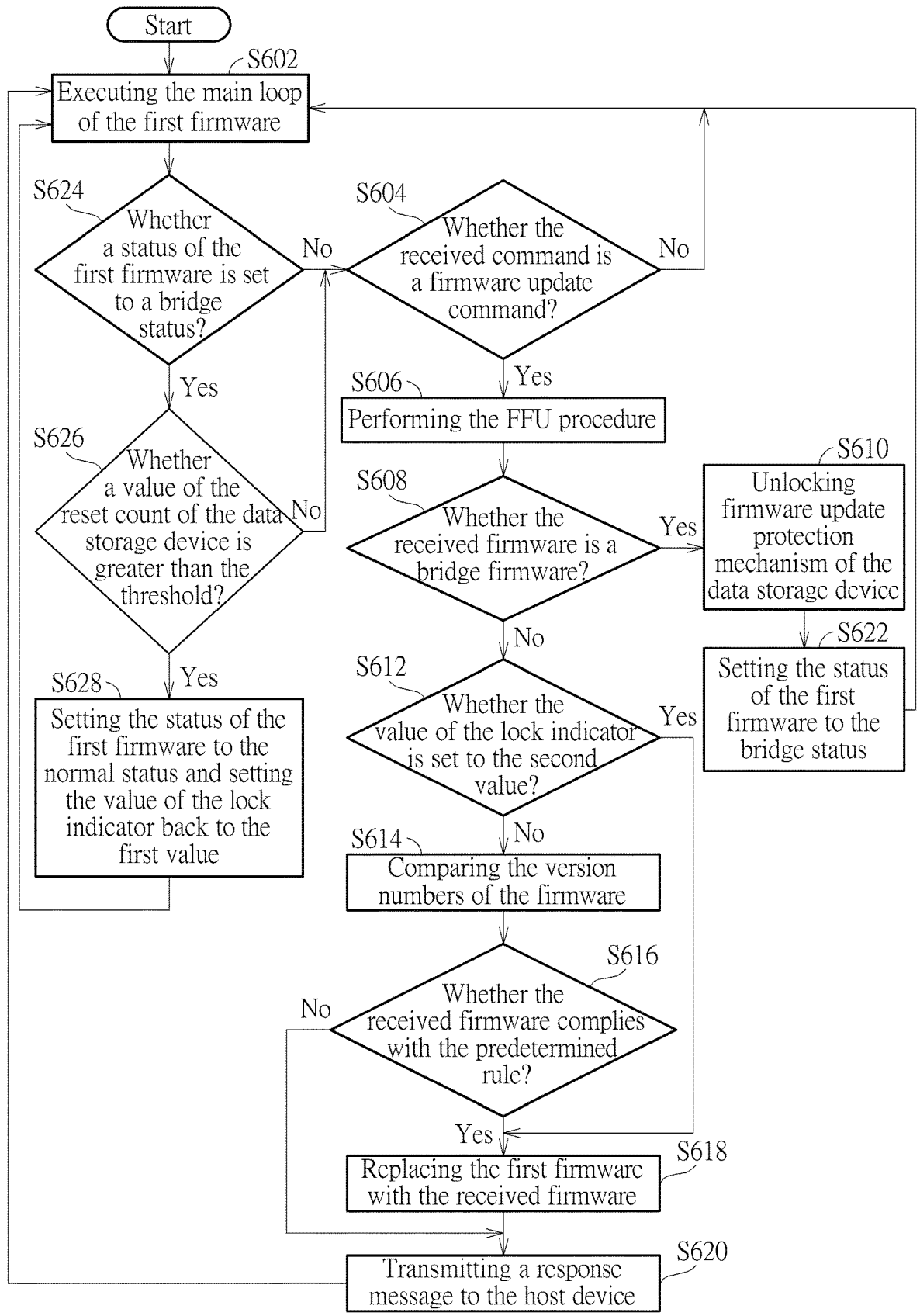
FIG. 6 is an exemplary flow chart showing a detailed flow of a firmware updating method according to another embodiment of the invention.

FIG. 6 is an exemplary flow chart showing a detailed flow of a firmware updating method according to another embodiment of the invention. The proposed firmware updating method may be performed by the memory controller 110 (e.g., the microprocessor 112 in the memory controller 110) and may comprise the following steps:

Step S602: executing a first firmware after the data storage device powers up. Similarly, the memory controller may maintain a lock indicator when operating in the first firmware and the value of the lock indicator may be set to a first value by default, to represent that a firmware update status of the data storage device 100 is set to a locked status. The execution of step S602 represents that the microprocessor 112 is currently operating in the main loop of the first firmware. When the microprocessor 112 receives any command, the microprocessor 112 may jump out of the main loop to perform the corresponding operation.

Step S624: determining whether a status of the first firmware is set to a bridge status. If the determination result shows yes, step S626 is performed. If the determination result shows no, step S604 is performed.

Step S626: determining whether a value of the reset count of the data storage device is greater than the threshold. If the determination result shows yes, step S628 is performed. If the determination result shows no, step S604 is performed.

Step S628: setting the status of the first firmware to a normal status and setting the value of the lock indicator back to the first value, for the firmware update status of the data storage device being reverted to the default locked status. Then, step S602 may be returned for the microprocessor 112 to operate in the main loop of the first firmware. It is to be noted that, in an embodiment of the invention, the microprocessor 112 may reset the value of the reset count of the data storage device recorded by itself to 0 at an appropriate time. For example, the microprocessor 112 may reset the value of the reset count to 0 in step S628.

Step S604: determining whether a received command is a firmware update command. When it is determined that the command received by the microprocessor 112 is a firmware update command, step S606 is entered to perform the corresponding operation. When it is determined that the command received by the microprocessor 112 is not a firmware update command, step S602 may be returned to keep operating in the main loop of the first firmware.

Step S606: performing the field firmware update (FFU) procedure and receiving the corresponding firmware file in response to the reception of the firmware update command.

Step S608: determining whether a version number of the received firmware is set to a specific version number, thereby determining whether the received firmware is a bridge firmware. When the version number of the received firmware is set to the specific version number, step S610 is performed. When the version number of the received firmware is not set to the specific version number, step S612 is performed.

Step S610: setting (or, changing) the value of the lock indicator to a second value different from the first value, to represent that the firmware update status of the data storage device 100 is set to an unlocked status. That is, the protection mechanism for the firmware update is now unlocked.

Step S622: setting the status of the first firmware to the bridge status. After changing the value of the lock indicator and setting the status of the first firmware to the bridge status, the operations corresponding to this firmware update command are completed and step S602 may be returned for the microprocessor 112 to operate in the main loop of the first firmware and wait for a next firmware update command.

Step S612: determining whether the value of the lock indicator is set to the second value. If the determination result shows yes, it means that the protection mechanism on the data storage device for the firmware update is unlocked and step S618 is performed for the microprocessor 112 to perform the unlocked firmware update procedure. If the determination result shows no, it means that the protection mechanism on the data storage device for the firmware update is still working and step S614 is performed for the microprocessor 112 to perform the locked firmware update procedure. For the case when the FFU procedure corresponding to the bridge firmware is ended and step S602 is returned, and when the microprocessor 112 receives the next firmware update command for actually performing the firmware update operation in step S604, the determination result in step S608 would be no and thus step S612 is entered.

Step S614: comparing the version number of the received firmware with the version number of the first firmware to facilitate the determination of whether the received firmware complies with the aforementioned predetermined rule in step S616.

Step S616: determining whether the received firmware complies with the predetermined rule. If the determination result shows yes, which means that the microprocessor 112 may replace the currently operating first firmware with the received firmware and step S618 is performed. If the determination result shows no, which means that the microprocessor 112 is not allowed to replace the currently operating first firmware with the received firmware and step S620 is performed.

Step S618: replacing the first firmware with the received firmware. Besides writing the received firmware codes into the data storage device 100, the operation of updating the firmware may also comprise setting the corresponding parameters so that the microprocessor 112 executes the new firmware codes after the data storage device powers up again.

Step S620: transmitting a response message to the host device. When determining that the received firmware does not comply with the predetermined rule, the microprocessor 112 is not allowed to replace the currently operating first firmware with the received firmware. Therefore, the microprocessor 112 may transmit a update failure response message to the host device to notify the host device of the result of firmware update failure. On the other hand, when step S620 is entered after the firmware update in step S618 is completed, the microprocessor 112 may transmit a update successful response message to the host device to notify the host device of the result of firmware update successful.

In the embodiments of the invention, the bridge firmware is utilized to switch the firmware update status of the data storage device, so as to unlock the firmware update limitation designed in the protection mechanism. Since the bridge firmware is a firmware with special design, the bridge firmware has the type of a firmware file. Therefore, the host device may simply unlock the firmware update limitation of the protection mechanism by transmitting the existing firmware update command. In the embodiments of the invention, the data storage device 100 may sequentially receive at least two firmware update commands when operating in its original firmware, where the first firmware update command is utilized to change the firmware update status of the data storage device through the bridge firmware and the second firmware update command is utilized to initiate the actual firmware update operation. When the data storage device 100 performs the corresponding firmware update operation in response to the second firmware update command to replace the original firmware with the new firmware, since the lock indicator maintained in the new firmware is also set to the locked status by default, the protection mechanism will be activated again after the firmware update operation is completed. Therefore, the firmware update status of the data storage device will be switched back to the locked status. In this manner, the firmware update of the data storage device in the proposed firmware updating method is more flexible as compared with the prior art and meanwhile, the proposed firmware updating method also considers the necessity of the protection mechanism achieving a result of protectively updating the firmware of the data storage device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
a memory device; and
a memory controller, coupled to the memory device and configured to access the memory device, wherein the memory controller is configured to execute a first firmware for the first firmware to be a currently operating firmware, maintain a lock indicator and set a value of the lock indicator to a first value when operating in the first firmware and receive a first firmware update command, wherein
in response to the first firmware update command, the memory controller is configured to receive a file of a second firmware and determine whether a version number of the second firmware is set to a specific version number,
when the version number of the second firmware is set to the specific version number, the memory controller sets the value of the lock indicator to a second value, and
wherein when the version number of the second firmware is not set to the specific version number, the memory controller further determines whether the value of the lock indicator is set to the second value, and
when the value of the lock indicator is set to the second value, the memory controller performs an unlocked firmware update procedure, and when the value of the lock indicator is not set to the second value, the memory controller performs a locked firmware update procedure.

2. The data storage device of claim 1, wherein when operating in the first firmware, the memory controller is further configured to receive a second firmware update command, and receive a file of a third firmware in response to the second firmware update command, and when the value of the lock indicator is set to the second value, the memory controller directly replaces the first firmware with the third firmware in the unlocked firmware update procedure.

3. The data storage device of claim 2, wherein when the value of the lock indicator is not set to the second value, the memory controller further checks whether a version number of the third firmware to determine whether the third firmware complies with a predetermined rule, when the third firmware complies with the predetermined rule, the memory controller replaces the first firmware with the third firmware in the locked firmware update procedure, and when the third firmware does not comply with the predetermined rule, the memory controller does not replace the first firmware with the third firmware.

4. The data storage device of claim 3, wherein the predetermined rule is that the first firmware and the third firmware are the firmware with the same tag.

5. The data storage device of claim 3, wherein the predetermined rule is that the first firmware and the third firmware are the firmware with the same tag and a version of the third firmware is later than a version of the first firmware.

6. The data storage device of claim 1, wherein when the version number of the second firmware is set to the specific version number, the second firmware is a bridge firmware and the file of the second firmware comprises information regarding the specific version number and dummy data.

7. The data storage device of claim 1, wherein the first firmware update command and the file of the second firmware are received from a host device through a host interface.

8. A firmware updating method for protectively updating a firmware of a data storage device,
comprising:
executing a first firmware after the data storage device powers up; and
receiving a first firmware update command,
wherein step of executing the first firmware after the data storage device powers up further comprises:
maintaining a lock indicator and setting a value of the lock indicator to a first value, and
in response to reception of the first firmware update command, the firmware updating method further comprises:
receiving a file of a second firmware and determining whether a version number of the second firmware is set to a specific version number;
setting the value of the lock indicator to a second value when the version number of the second firmware is set to the specific version number;
determine whether the value of the lock indicator is set to the second value when the version number of the second firmware is not set to the specific version number;
performing an unlocked firmware update procedure when the value of the lock indicator is set to the second value; and
performing a locked firmware update procedure when the value of the lock indicator is not set to the second value.

9. The firmware updating method of claim 8, further comprising:
receive a second firmware update command,
wherein in response to reception of the second firmware update command, the firmware updating method further comprises:
receiving a file of a third firmware; and
directly replacing the first firmware with the third firmware in the unlocked firmware update procedure when the value of the lock indicator is set to the second value.

10. The firmware updating method of claim 9, wherein when the value of the lock indicator is not set to the second value, the firmware updating method further comprises:
checking whether a version number of the third firmware to determine whether the third firmware complies with a predetermined rule;
replacing the first firmware with the third firmware in the locked firmware update procedure when the third firmware complies with the predetermined rule; and
not replacing the first firmware with the third firmware when the third firmware does not comply with the predetermined rule.

11. The firmware updating method of claim 10, wherein the predetermined rule is that the first firmware and the third firmware are the firmware with the same tag.

12. The firmware updating method of claim 10, wherein the predetermined rule is that the first firmware and the third firmware are the firmware with the same tag and a version of the third firmware is later than a version of the first firmware.

13. The firmware updating method of claim 8, wherein when the version number of the second firmware is set to the specific version number, the second firmware is a bridge firmware and the file of the second firmware comprises information regarding the specific version number and dummy data.

14. The firmware updating method of claim 8, wherein the first firmware update command and the file of the second firmware are transmitted by a host device through a host interface to the data storage device.

* * * * *